May 21, 1963    E. EINARSSON    3,090,581
FLYING CAR

Filed Aug. 12, 1959    3 Sheets-Sheet 1

INVENTOR
EINAR EINARSSON

BY
Watson Cole Grindle + Watson
ATTORNEYS

INVENTOR
EINAR EINARSSON
BY Watson Cole Grindle & Watson
ATTORNEYS

May 21, 1963  E. EINARSSON  3,090,581
FLYING CAR

Filed Aug. 12, 1959  3 Sheets-Sheet 3

INVENTOR
EINAR EINARSSON
BY Watson, Cole, Grindle & Watson
ATTORNEYS

3,090,581
FLYING CAR
Einar Einarsson, 7 Eastern Parkway, Farmingdale, N.Y.
Filed Aug. 12, 1959, Ser. No. 833,334
10 Claims. (Cl. 244—2)

This invention relates to a flying car, that is one capable of conversion from flying to one able to travel on the ground as well as from a ground automobile to a flying vehicle.

It is an object of this invention to provide a ground vehicle with propellers and wings as well as wing flaps so that the vehicle may take off and fly in the air. Another object of the invention resides in the use of a common power plant to supply the motive power for rotating the propellers as well as to rotate the wheels of the vehicle.

A further object of the invention resides in the provision of spaces in the vehicle both front and back to mount removable propellers and to provide space for the rotation of the propellers. The spaces for the rotating propellers is utilized to receive the side flaps or wings so that when the vehicle is used for ground transportation the propeller spaces will be completely filled. Another object of the invention resides in the provision of a pair of adjustable main wings which are in front and back of the driver's compartment which when raised at an angle to the horizontal, serve to support the vehicle in the air.

Another object of the invention resides in a flying car in which a pair of stabilizers are pivotally mounted on the front and back of the car. The stabilizers when folded against the car will cover the spaces for the front and rear propellers.

A further object of the invention resides in a flying car with front and rear propellers of which the front propeller is of the pulling type and the rear propeller is of the pusher type. The propellers may be feathered so that each propeller may be converted from a pulling propeller to a pushing propeller. A still further object of the invention resides in a pair of interconnected wing sections between which the operator of the car or airplane is seated. The wings are interconnected by a light metal or plastic sheet which is bendable to accommodate the bent wings.

Further objects will be apparent from the following description when considered in connection with the accompanying drawings in which.

Figure 1:
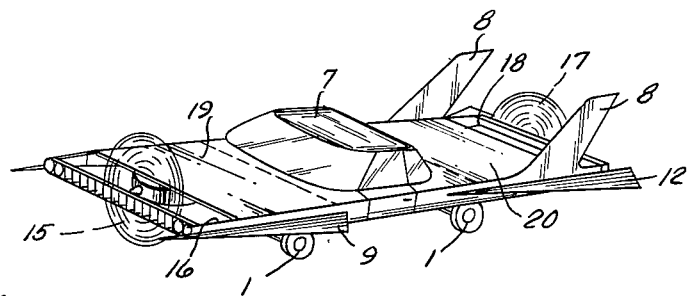
FIGURES 1 to 4 are perspective views of the flying car in flying position as in FIGURES 1 to 3 and in ground locomotion position as in FIGURE 4.
Figure 2:
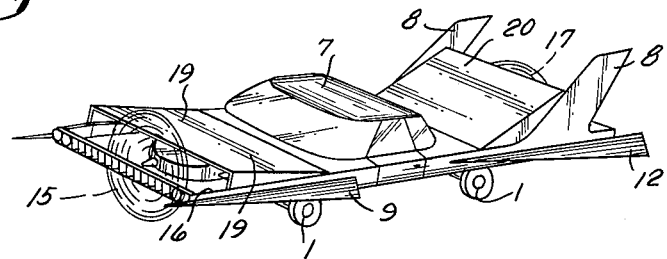
Figure 3:
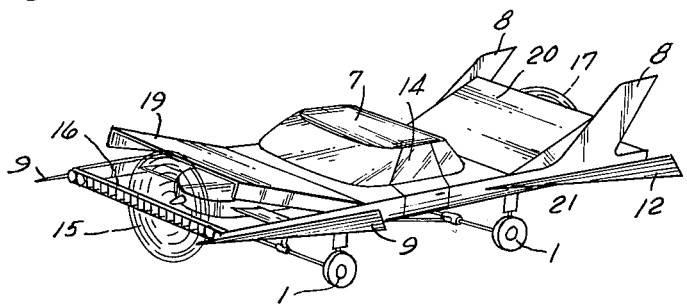
Figure 4:
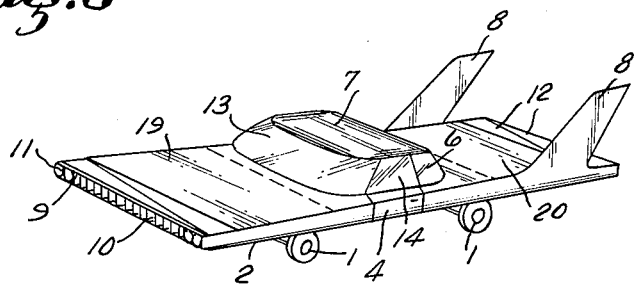
Figure 5:
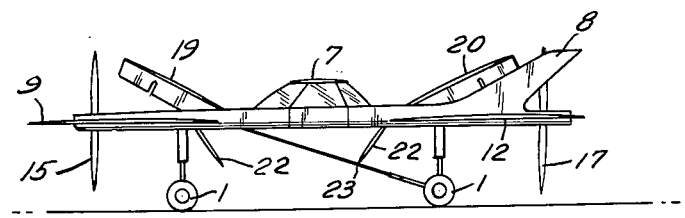
FIGURE 5 is a side view of the car of FIGURES 1 to 4 showing take-off and landing adjustment.

In the structure of FIGURES 1 to 4 the car shown is capable of cruising on the ground as well as in the air and FIGURE 4 shows the car assembled and adjusted ready for ground travel on the wheels 1. For ground travel power is derived from an engine which drives the propellers and by transmission means, as shown in U.S. Patent No. 2,446,528 of August 10, 1948, also drives the wheels. The body or frame 2 of the car has a raised portion 3 composed of doors 4, windshield 13 and glass windows 6. A roof 7 covers the space to be occupied by the operator and passengers. Two upwardly extending stabilizing fins or rudders 8 are provided on the rear end of the car and as shown the front end has two interfitting surface fins 9 adjacent a front grill 10 with the usual head lights 11 therein. The rear end is also provided with two interfitting surface fins 12 and as shown in FIGURE 3 which illustrates the car in flight, the front fins 9 are secured along the front sides of the car and the rear fins 12 are mounted along the rear sides of the car. The fins 9 and 12 may be secured to the side of the car by any suitable means such as bolts or lock pins.

The car of FIGURES 1 to 4 may be provided with a full vision windshield 13 and each door 4 may have a side window 14 with the windows and windshield made of glass or clear plastic. A front propeller 15 is rotatably mounted to rotate in the space 16 in the car to be driven by any suitable transmission members connected to a motor in the car. There is also a rear propeller 17 mounted to rotate in the rear space 18. In FIGURE 4 the space 18 is covered by the fins 12 but FIGURE 1 best shows this rear space. The car is also provided with a pivoted front wing 19 and a pivoted rear wing 20 with FIGURES 1 and 4 showing the wings down in horizontal position in non-flying condition, whereas FIGURES 2 and 3 show the wings 19 and 20 raised for flying position of the parts.

Figure 7:
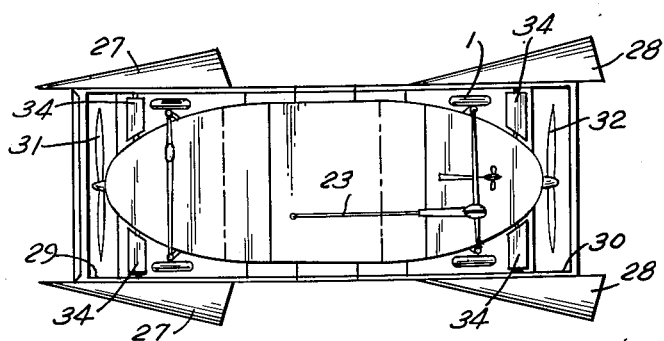
FIGURE 7 is a bottom plan view of the flying car.
Figure 8:
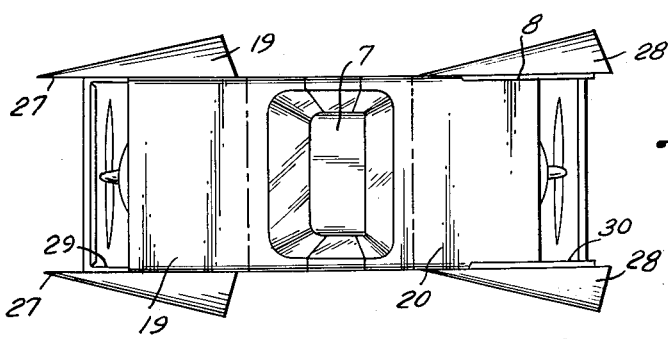
FIGURE 8 is a top plan view of the car of FIGURE 7.

FIGURE 7 shows the lower wing or flap sections 22 used to create air lift or brake surfaces depending upon the demands made on the car. A transmission rod 23 is utilized to provide motive power to the rear wheels 1 when the car is traversing the ground as shown in FIGURE 8.

Figure 6:
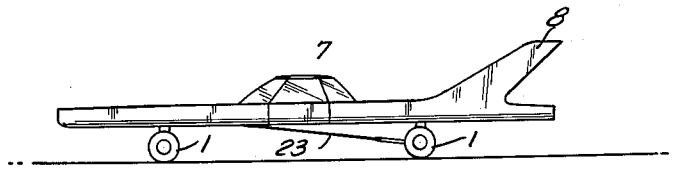
FIGURE 6 is a side view showing the car as a land vehicle.
Figure 9:
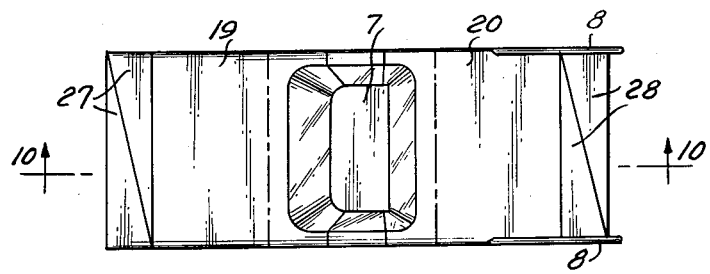
FIGURE 9 is a top plan view of the car in non-flying condition.
Figure 10:
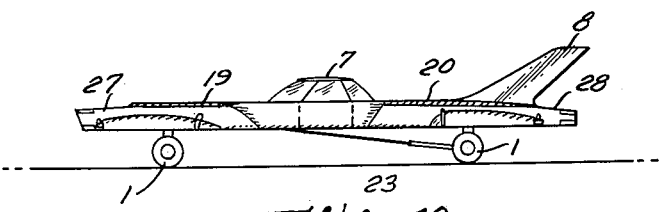
FIGURE 10 is a longitudinal section of the car taken on line 10—10 of FIGURE 9 in the direction of the arrows.

The car shown in FIGURES 6 to 10 is quite similar to the car of FIGURES 1 to 4 and as shown in FIGURES 6 and 7 the side fins or stabilizers 27 and 28 are in flying position whereas in FIGURES 9 and 10 they are in position to close over the propeller spaces. The propeller spaces 29 and 30 accommodate propellers 31 and 32 respectively and as best shown in FIGURE 6 a small propeller 33 is for use when the vehicle is used as a boat. Stabilizing vanes 34 are mounted front and back in pairs, for pivotal adjustment and as shown in FIGURES 1 to 4, wings 19 and 20 are also provided on the car of FIGURES 6 to 10.

Figure 11:
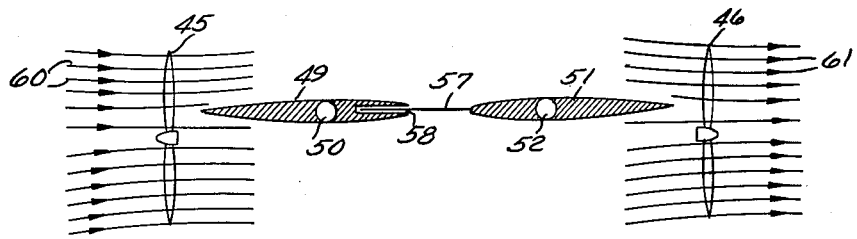
FIGURE 11 is a diagrammatic view showing one position of the propellers and the wings with interconnecting surface member.
Figure 12:
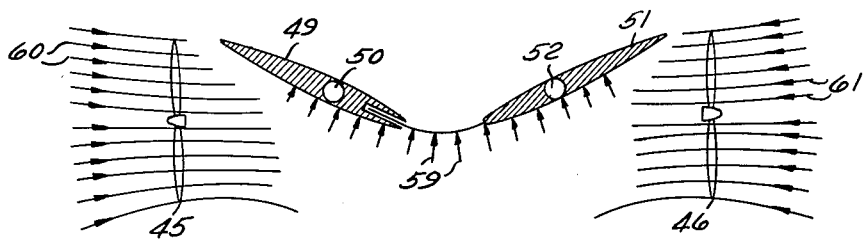
FIGURE 12 is a diagrammatic view showing another position of the propellers and wings with the interconnecting surface member of FIGURE 11.

FIGURES 11 and 12 illustrate a modified form of flying car in which the front propeller 45 as well as the rear propeller 46 are entirely in the open.

As shown in FIGURES 11 and 12 the wings 49 and 51 are shown as interconnected by a resilient sheet member 57 which may be connected to one wing such as 51 and is slidable in a slot 58 in the wing 49. When the wings 49 and 51 are adjusted on their axes 50 and 52 as shown in FIGURES 11 and 12, the member 57 flexes into a bow or curved shape as shown in FIGURE 12 with the arrows 59 indicating the thrust of the air on the wings 49 and 51 and member 59 when the vehicle is in flight. The arrows 60 in the stream for the propeller 45 and the arrows 61 for the air stream for the propeller 46 shows direction of the air flow even when the propeller 46 is feathered to the position of FIGURE 12 where the stream 61 is reversed.

The operation of the flying car has been referred to in the foregoing in that the car after travelling on land may be easily converted for air travel by removing the stabilizers and wings and placing them in position on the outside of the vehicle. The road wheels may be raised and the propellers are now in position for operation. By suitable adjustment of the wings the car can take-off and when in the air the wings are further adjusted for cruising speed.

FIGURES 11 and 12 also illustrate the take-off position of the parts as in FIGURE 12 with the blades of the propeller 46 suitably adjusted to force the air back of the wings so that the air as indicated by the arrows 59 will force the vehicle upward until high enough when the parts are adjusted so that the air streams will follow the one direction indicated. Also when cruising in the air the wings 49 and 51, FIGURE 11, are adjusted practically horizontal.

As already referred to each car may have a common motor plant to drive both the ground wheels as well as the propellers with suitable clutch devices to control one or the other cruising power. Separate power plants may be used and for air travel jet engines may also be used with and without the use of propellers.

I claim as my invention:

1. A vehicle capable of cruising on land and in the air comprising a body, a plurality of wheels mounted under the body to support the vehicle while on the ground, means for supplying power to the wheels for cruising on the ground, front and rear propellers mounted on the body to provide for take-off and cruising power when in the air, and a pair of pivotally mounted wings secured on the body and being adjustable as to the angles to the horizontal for take-off and cruising positions for the wings, said propellers being connected to receive power from the power supplying means and the wings forming a wing extending from the front propeller to the rear propeller with a bridging element to receive the pressure between the propellers.

2. A vehicle capable of cruising on land and in the air comprising a body, a plurality of wheels mounted under the body to support the vehicle while on the ground, means for supplying power to the wheels for cruising on the ground, front and rear propellers mounted on the body to provide for take-off and cruising power when in the air, and a pair of pivotally mounted wings secured on the body and being adjustable as to the angles to the horizontal for take-off and cruising positions for the wings, said propellers being connected to receive power from the power supplying means and one of the propellers having reversible blades to adjust for take-off and cruising of the vehicle and the wings forming a wing extending from the front propeller to the rear propeller with a bridging element to receive the pressure between the propellers.

3. A vehicle capable of cruising on land and in the air comprising a body, a plurality of wheels mounted under the body to support the vehicle while on the ground, means for supplying power to the wheels for cruising on the ground, front and rear propellers mounted on the body to provide for take-off and cruising power when in the air, a pair of pivotally mounted wings secured on the body and being adjustable as to the angles to the horizontal for take-off and cruising positions for the wings, said propellers being connected to receive power from the power supplying means, and two pairs of stabilizers removably attachable on the sides of the body at the front and rear ends of the vehicle, said stabilizers interfitting for placement on the front and rear ends of the body to cover the propellers when the vehicle is travelling on the ground.

4. A vehicle capable of cruising on land and in the air comprising a body, a plurality of wheels mounted under the body to support the vehicle while on the ground, means for supplying power to the wheels for cruising on the ground, front and rear propellers mounted on the body to provide for take-off and cruising power when in the air, a pair of pivotally mounted wings secured on the body and being adjustable as to the angles to the horizontal for take-off and cruising positions for the wings, said propellers being connected to receive power from the power supplying means, and two pairs of stabilizers pivotally mounted on the front and rear ends of the body so that each stabilizer may be adjusted to flying position or against and over the body for land cruising said wings forming a wing structure with a bridging element between the propellers.

5. A flying vehicle comprising a body having landing wheels secured thereto, a front propeller and a rear propeller mounted on the body, a pair of wings one behind the front propeller and the other in front of the rear propeller to form a wing structure with a bridging element, each wing having means to adjust it relative to the horizontal to increase or decrease the lift on the wings, said propellers having power means to rotate the propellers so that the pressure between the propellers will be utilized on the wings, and the rear propeller having reversing blades so that the vehicle may take-off from the ground in a vertical direction.

6. A land vehicle capable of conversion to an aircraft comprising a body provided with a compartment for the operator, a plurality of wheels for locomotion on the ground, at least one propeller mounted on the body for use of the vehicle as an aircraft, means for supporting the wheels and connected to the body to adjust the wheels vertically and when close to the body the vehicle is operated as an aircraft and a pair of wings pivotally mounted on the body adjustable upwardly at an angle to the horizontal to provide lift for the vehicle as an aircraft and when horizontal the vehicle is adjusted for operation on the ground, said wings forming a wing structure with a bridging element to utilize the pressure of the propeller.

7. A land vehicle according to claim 6, in which a pair of propellers are provided one in front and the other at the back of the vehicle with the rear propeller having blades adjustable to reverse the direction of airflow toward the center of the vehicle body for take-off of the vehicle for air travel.

8. A land vehicle according to claim 6, in which a plurality of stabilizer fins are provided mounted on the body to control the vehicle while travelling in the air.

9. A land vehicle according to claim 6, in which a plurality of stabilizer fins are provided mounted on the body to control the vehicle while travelling in the air, and in which a pair of vertical rudder members are secured on the body at the rear end thereof with one on each side of the vehicle.

10. A vehicle according to claim 1, in which said bridging element is secured to one of the wings and slidable in the other wing.

References Cited in the file of this patent
UNITED STATES PATENTS

| | | |
|---|---|---|
| 1,130,125 | Wilkins | Mar. 2, 1915 |
| 1,579,654 | Harpstrite | Apr. 6, 1926 |
| 1,814,115 | Blain | July 14, 1931 |
| 1,938,171 | Braley | Dec. 5, 1933 |
| 2,446,528 | Clark | Aug. 10, 1948 |
| 2,681,773 | Rethorst | June 22, 1954 |
| 2,811,323 | Rethorst | Oct. 29, 1957 |